US007406295B1

(12) United States Patent
Yarkosky (10) Patent No.: US 7,406,295 B1
(45) Date of Patent: Jul. 29, 2008

(54) METHOD FOR DYNAMICALLY DIRECTING A WIRELESS REPEATER

(75) Inventor: Mark Yarkosky, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 179 days.

(21) Appl. No.: 10/659,647

(22) Filed: Sep. 10, 2003

(51) Int. Cl.
*H04B 1/60* (2006.01)

(52) U.S. Cl. .......................... 455/9; 455/10; 455/11.1; 455/13.1; 455/550.1; 455/562.1; 455/450; 455/453; 455/16

(58) Field of Classification Search ................ 455/436, 455/452.2, 453, 11.1, 13.3, 21, 25, 7, 8, 9, 455/10, 63.1, 63.2, 63.4, 67.11, 67.13, 501, 455/95, 115.1, 135, 167.1, 423, 438, 439, 455/13.1, 16, 19, 562.1, 513, 514, 550.1, 455/561, 450; 370/243, 246, 274, 279, 315, 370/492, 501
See application file for complete search history.

(56) References Cited

U.S. PATENT DOCUMENTS

| | | | |
|---|---|---|---|
| 5,293,172 A | 3/1994 | Lamberty et al. | |
| 5,504,935 A | 4/1996 | Vercauteren | |
| 5,534,872 A * | 7/1996 | Kita ............................ | 342/146 |
| 5,628,052 A | 5/1997 | DeSantis et al. | |
| 5,812,935 A | 9/1998 | Kay | |
| 5,832,368 A | 11/1998 | Nakano et al. | |
| 5,883,884 A | 3/1999 | Atkinson | |
| 5,907,794 A * | 5/1999 | Lehmusto et al. .......... | 455/11.1 |
| 5,970,061 A | 10/1999 | Koludo | |
| 6,005,530 A | 12/1999 | Jovanovich | |
| 6,005,884 A * | 12/1999 | Cook et al. .................. | 375/132 |
| 6,006,075 A | 12/1999 | Smith et al. | |
| 6,035,218 A | 3/2000 | Oh et al. | |
| 6,108,323 A | 8/2000 | Gray | |
| 6,433,737 B2 | 8/2002 | Katz | |

(Continued)

FOREIGN PATENT DOCUMENTS

WO    WO 9927747    6/1999

OTHER PUBLICATIONS

Per Lehne and Magne Pettersen, "An Overview of Smart Antenna Technology for Mobile communications Systems," IEEE Communications Surveys, vol. 2 No. 4, 1999.

(Continued)

*Primary Examiner*—Rafael Perez-Gutierrez
*Assistant Examiner*—Olumide T Ajibade Akonai (57) ABSTRACT

A method for dynamically directing a wireless repeater is provided. A repeater will include an antenna, a mobile station modem, a processor and data storage. The processor will cause the antenna to sweep over a coverage area, possibly through increments. At each increment, the antenna will receive signals and pass the signals to the MSM. The MSM will then apply a rake receiver to identify characteristics in the received signals, such as PN offsets and signal-to-noise ratios ($E_C/I_O$) for each PN offset, and the processor will record in the data storage the PN offsets and corresponding signal-to-noise ratios at that increment. Given this data, the processor will then instruct the antenna to move to the increment where the MSM detected the strongest signal-to-noise ratio. As a result, the antenna of the repeater will point at a base station that is likely to supply the signal with the highest signal-to-noise ratio.

14 Claims, 7 Drawing Sheets

U.S. PATENT DOCUMENTS

| | | | |
|---|---|---|---|
| 6,459,881 B1 | 10/2002 | Hoder et al. | |
| 6,515,635 B2 | 2/2003 | Chiang et al. | |
| 6,567,460 B1* | 5/2003 | Tak et al. | 375/140 |
| 6,600,918 B1 | 7/2003 | Youngs et al. | |
| 6,600,934 B1 | 7/2003 | Yun et al. | |
| 6,609,012 B1 | 8/2003 | Malmgren et al. | |
| 6,611,695 B1 | 8/2003 | Periyalwar | |
| 6,697,642 B1 | 2/2004 | Thomas | |
| 6,718,158 B1 | 4/2004 | Suonvieri | |
| 6,731,905 B2 | 5/2004 | Ogino et al. | |
| 6,748,212 B2* | 6/2004 | Schmutz et al. | 455/424 |
| 6,751,480 B2 | 6/2004 | Koglantis et al. | |
| 6,778,809 B2* | 8/2004 | Morimoto | 455/11.1 |
| 6,782,277 B1* | 8/2004 | Chen et al. | 342/359 |
| 6,795,018 B2 | 9/2004 | Guo | |
| 6,799,024 B2* | 9/2004 | Wang et al. | 455/234.1 |
| 6,801,790 B2 | 10/2004 | Rudrapatna | |
| 6,804,491 B1 | 10/2004 | Uesugi | |
| 6,816,732 B1* | 11/2004 | Farley et al. | 455/453 |
| 6,834,198 B1 | 12/2004 | Hachenberger et al. | |
| 6,862,430 B1 | 3/2005 | Duffy et al. | |
| 6,993,287 B2* | 1/2006 | O'Neill | 455/11.1 |
| 7,003,261 B2* | 2/2006 | Dietz et al. | 455/11.1 |
| 7,103,386 B2* | 9/2006 | Hoffmann et al. | 455/562.1 |
| 2002/0028675 A1 | 3/2002 | Schmutz et al. | |
| 2002/0072357 A1* | 6/2002 | Matsuda | 455/422 |
| 2002/0132600 A1 | 9/2002 | Rudrapatna | |
| 2002/0187812 A1 | 12/2002 | Guo | |
| 2002/0187813 A1 | 12/2002 | Guo | |
| 2003/0013410 A1 | 1/2003 | Park | |
| 2003/0032453 A1 | 2/2003 | Katz et al. | |
| 2003/0124976 A1* | 7/2003 | Tamaki et al. | 455/15 |
| 2003/0143948 A1* | 7/2003 | Han et al. | 455/11.1 |
| 2003/0162550 A1* | 8/2003 | Kuwahara et al. | 455/456 |
| 2003/0220109 A1* | 11/2003 | Jami et al. | 455/437 |
| 2003/0222818 A1 | 12/2003 | Regnier et al. | |
| 2004/0146013 A1* | 7/2004 | Song et al. | 370/279 |
| 2004/0157645 A1 | 8/2004 | Smith et al. | |
| 2004/0203706 A1* | 10/2004 | Dietz et al. | 455/422.1 |
| 2005/0068231 A1 | 3/2005 | Regnier et al. | |
| 2005/0170832 A1 | 8/2005 | Cooper | |
| 2005/0227619 A1 | 10/2005 | Lee et al. | |

OTHER PUBLICATIONS

Rashid Attar and Eduardo Esteves, "A Reverse Link Outer-Loop Power Control Algorithm for cdma2000 1xEV Systems," ICC 2002, Apr. 2002.

Eduardo Esteves et al., "Link Adaptation Techniques for High-Speed Packet Data in Third Generation Cellular Systems," European Wireless Conference 2002.

Mingxi Fan and Eduardo Esteves, "The Impact of Antenna-Array Receivers on the Reverse Link Performance of CDMA2000 1xEV High Rate Packet Data Systems," VTC 2003.

Metawave "spotlight 2230" brochure, http://www.metawave.com/PDFs/Products/Integrated/SL2230_brochure.pdf, printed from the World Wide Web on May 21, 2002.

Office Action from U.S. Appl. No. 11/311,819, dated Mar. 9, 2006.
Office Action from U.S. Appl. No. 11/311,819, dated Aug. 25, 2006.
Office Action from U.S. Appl. No. 11/311,819, dated Apr. 16, 2007.
Office Action from U.S. Appl. No. 11/311,819, dated Sep. 25, 2007.

* cited by examiner

METHOD FOR DYNAMICALLY DIRECTING A WIRELESS REPEATER

FIELD OF INVENTION

The present invention relates to wireless communications, and more particularly, to wireless repeater functionality.

BACKGROUND

In a cellular wireless communication system, such as a code division multiple access (CDMA) system for instance, base stations are positioned throughout a coverage area and emit radio frequency radiation patterns that define cells. Mobile stations operating in a given cell may then wirelessly communicate with the serving base station, and the base station may provide connectivity with further network components such as switches and gateways that connect with transport networks.

In a CDMA system, each cell is typically divided into a number of sectors, each of which is identified by a specific pseudo-noise offset (i.e., "PN offset") of a specific spreading sequence that is used to encode communications with mobile stations operating in the cell. At any given instant, a mobile station may thus operate in a given sector, and may thereby communicate with the serving base station using the PN offset of that sector. (In practice, an idle mobile station may communicate on a single PN offset (i.e., in a single sector) at once; an active mobile, on the other hand, might communicate on multiple PN offsets (i.e., in multiple sectors) at once, although a dominant one of those active PN offsets might be the focus of communications at any given moment.)

Unfortunately, in some wireless networks, the cells may not seamlessly cover an entire area, so there may be a hole in coverage between cells. To solve this problem, a wireless carrier may install a repeater that functions to extend the range of a given cell or sector, so as to fill in the hole in coverage. Such a repeater may be able to receive a signal distorted by transmission losses and to regenerate or replicate the signal. The repeater would include a donor antenna that would communicate with a base station, a coverage antenna that would communicate with mobile stations, and a build-out circuit that would boost communications from the base station to the mobile stations. For example, the repeater may be positioned between a mobile station and a base station to intercept signals sent between them. The repeater may amplify the power of these intercepted signals and send amplified versions of these signals to the mobile station or the base station. Therefore, the repeater may effectively extend the range of a given cell by boosting communications between a mobile station and a base station.

In practice, the donor antenna of a repeater may receive signals from multiple base stations and multiple base station sectors (i.e., signals with multiple PN offsets) at once and boost all of those signals. In addition, the repeater will receive signals from mobile stations, boost the signals, and radiate the amplified signals to all nearby base stations. However, radiating the amplified signals to all nearby base stations can decrease the capacity of base stations that are not the intended recipient of the amplified signals by increasing the ambient noise level. Furthermore, even if the donor antenna of the repeater is set to radiate to a single base station, when that base station becomes loaded with primary traffic from the system (e.g., traffic not from the extended coverage of the repeater) the repeater traffic can cause a decrease in the overall capacity of the base station due to the noise rise at the base station caused by the noise generated by the repeater.

It would therefore be desirable to have a repeater repeat signals from and to just one base station or to repeat signals from and to just one sector (one PN offset) of one base station with which the mobile station is in communication. It would be even more desirable to have a repeater determine the one base station or one sector to which it repeats signals. Furthermore, it would be desirable to have a repeater be able to change its donor base station by handing off communications from one base station to another that has less traffic, for example.

SUMMARY

According to an exemplary embodiment, a method for dynamically directing a wireless repeater is provided. The method may be performed in a cellular network in which a mobile station communicates with base stations through a wireless repeater. The method includes monitoring a load of the base stations, and based on the load of the base stations, repeating wireless signals to one of the base stations. For example, signals may be repeated to a base station that has surplus capacity. The method may further include continually monitoring the load of the base stations, and upon identifying a second base station having a higher carrier-to-cochannel interference ratio, performing a handoff of the wireless signals to the second base station.

In another respect, the method may include the wireless repeater determining carrier-to-cochannel interference ratios of received wireless signals, and based on the carrier-to-cochannel interference ratios, directing the wireless repeater to radiate amplified wireless signals in a direction of a given base station.

In still another respect, the exemplary embodiment may be performed using a wireless repeater that may radiate in a number of directions to provide a number of coverage areas. The method may include incrementally adjusting the wireless repeater to receive wireless signals within the number of coverage areas and determining characteristics of the wireless signals. The method further includes, based on the characteristics, directing the wireless repeater to radiate amplified wireless signals to one of the number of coverage areas.

In yet another respect, the exemplary embodiment may take the form of a wireless repeater. The wireless repeater may include a donor antenna, a mobile station modem and a processor. The donor antenna communicates with a plurality of base stations, and the mobile station modem receives wireless signals from the donor antenna and identifies characteristics of the wireless signals. The processor then records in data storage the characteristics of the wireless signals and, based on the characteristics, directs the donor antenna to radiate amplified wireless signals to a given base station.

These as well as other features and advantages will become apparent to those of ordinary skill in the art by reading the following detailed description, with appropriate reference to the accompanying drawings.

BRIEF DESCRIPTION OF FIGURES

Exemplary embodiments of the present invention are described with reference to the following drawings, in which.

DETAILED DESCRIPTION OF EXEMPLARY EMBODIMENTS

An exemplary embodiment of the present invention minimizes the number of sectors that a repeater repeats in order to repeat signals from just one base station, or from just one sector (one PN offset) of one base station. In this manner, the repeater may direct its retransmission of signals to a selected area, e.g., to a selected sector of a base station. According to the exemplary embodiment, a donor antenna of a repeater will be a smart antenna such as a phased array (PA) antenna that can dynamically (e.g., automatically in real time) point a narrow beam in a desired direction (e.g., by changing the phases of its various elements). The repeater will then include a mobile station modem (MSM), a processor and data storage. Preferably, the MSM, PA, processor and data storage will be coupled together through a system bus or some other mechanism.

In operation, the processor will cause the PA antenna to sweep over a coverage area, preferably through increments. At each increment, the PA antenna will receive signals and pass the signals to the MSM. The MSM will then apply a rake receiver to identify PN offsets in the received signals (to distinguish the signals), measure a signal-to-noise ratio ($E_c/O_o$) (or carrier-to-cochannel interference ratio) for each PN offset, and the processor will record in the data storage the PN offsets and corresponding signal-to-noise ratios at that increment. Given this data, the processor will then instruct the PA antenna to radiate signals at the increment where the MSM detected the strongest signal-to-noise ratio.

As a result, the donor antenna of the repeater will point at a base station that is likely to supply the pilot signal with the highest signal-to-noise ratio. In this manner, the repeater may simply operate for one base station at a time or extend the coverage area of the base station that carries the least amount of traffic at any given point in time. For example, the repeater may handoff calls from heavily loaded base stations, as determined by low carrier-to-cochannel interference ratios, to less loaded base stations. Further, if the beam width of the donor antenna is sufficiently narrow, the repeater will likely receive signals from just that base station and the repeater will receive few if any signals from other base stations.

Wireless Network Architecture

Figure 1:
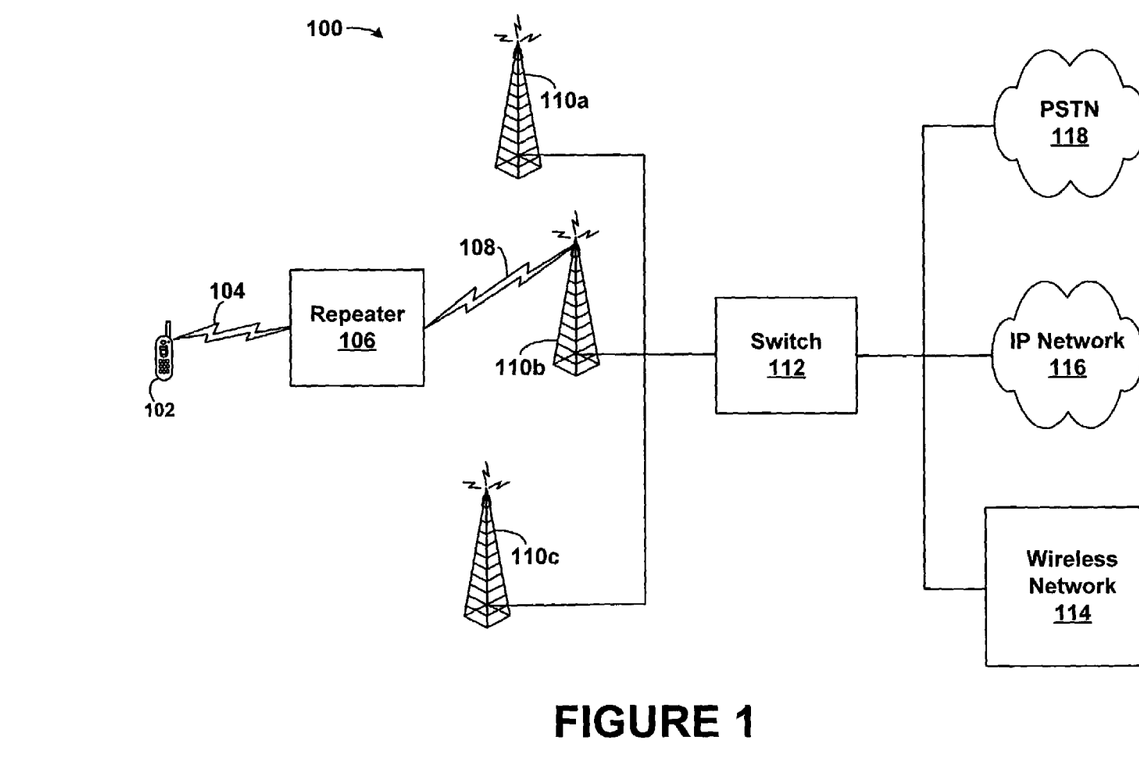
FIG. 1 is a block diagram illustrating one embodiment of a wireless communication network.

Referring now to the figures, FIG. 1 is a block diagram illustrating one embodiment of a wireless communication network 100. It should be understood, however, that this and other arrangements described herein are set forth for purposes of example only, and other arrangements and elements can be used instead and some elements may be omitted altogether. Further, many of the elements described herein are functional entities that may be implemented as hardware, firmware or software, and as discrete components or in conjunction with other components, in any suitable combination and location.

As shown in the example arrangement of FIG. 1, network 100 includes a mobile station (MS) 102 coupled via link 104 to a repeater 106. In turn, repeater 106 is coupled via link 108 to a base station 110b. Base station 110b and other base stations 110a and 110c are coupled to a switch 112, which is in communication with a wireless network 114, an Internet protocol (IP) network 116, and a Public Switched Telephone Network (PSTN) 118. Switch 112 may also be in communication with other transport networks as well.

The network 100 may be divided geographically into a number of cell sites (or simply "cells"), which are defined by the coverage areas of respective base stations. Each base station transceives with a number of mobile stations that reside within its radio coverage area. In practice, base stations are deployed so that each cell partially overlaps with other cells in the vicinities of their boundaries. The overlapping of cells permits mobile stations to maintain continuous (or near continuous) communications with the called party while moving between cells.

Cells are arranged in clusters, and usually each cluster uses the entire allocated frequency spectrum. Clusters are designed in a fashion so that the limited spectrum is repeatedly used over large geographic areas, with each cluster supporting a substantially same numbers of users. Cochannel interference results from cells that are assigned the same frequency being spaced too close together. As the traffic increases on these cells, the interference rises as the amount of forward link communications (e.g., base station to the mobile) increases.

A cellular network should be designed to maximize the carrier-to-cochannel interference (C/I) ratio (or referred to as the Chip Energy to total Interference ratio ($E_c/I_o$), e.g., where $I=I_{SC}+I_{OC}$, and where SC is same cell interference and OC is other cell interference). The carrier-to-cochannel interference ratio is a ratio of the energy of a pilot signal to the total power in the channel. The total power in the channel includes the pilot signal, pilots from other base stations, traffic, and other channels and noise. One way to maximize the carrier to interference ratio is to increase the frequency re-use distance, i.e., increase the distance between cells using the same set of transmission frequencies. For example, in an advanced mobile phone system (AMPS) system, C/I is equal to about 18 dB and the minimum required separation of cells, based on C/I=18 dB, is about 4.6R, where R is the radius of the cell. This means that the signal from the communicating cell is 18 dB larger than the interfering signal coming from a neighboring cell (or cells). When the network is loaded with calls to its capacity, the received C/I is just sufficient to meet link requirements, but will not meet the requirements if another user is added to the link. Therefore, the C/I is also a measure of capacity of the cells.

Most cell sites are usually further divided geographically into a number of sectors and each sector is defined respectively by radio frequency (RF) radiation patterns from antenna components of the respective base station. FIG. 1 illustrates three base stations 110a-c, which comprise three cells. The size and shape of each cell may vary due to location of the cell (e.g., urban vs. rural area) or other network design factors. Furthermore, network 100 may include more or fewer base stations, or the existing base stations can be arranged in an entirely different manner as well.

The RF radiation pattern from the antenna components of a respective base station produces an air interface, such as link 108, that provides a communication path between repeater 106 and the base station 110b. Similarly, repeater 106 communicates with MS 102 through link 104. MS 102 can then communicate with base station 110b through repeater 106. MS 102 can communicate through this path with entities on network 100, such as IP network 116, or with other mobile stations.

Wireless Communications

Wireless signaling between MS 102 and base station 110b may operate according to any wireless network protocol, such as global system for mobile communications (GSM), time division multiple access (TDMA), or code division multiple access (CDMA), for example. The specific protocol depends upon how voice or data signals are transferred between the MSs and base stations, as well as the utilization of transmission frequencies, considering available bandwidth and the network's capacity constraints.

In a CDMA network, cell sites may operate with multiple carrier frequencies. On a given frequency in a CDMA system, multiple communication channels exist, each distinguished by a "Walsh code." Walsh code is a term used for a digital modulation code that distinguishes individual signals on the RF carrier frequency being transmitted. There are 64 possible Walsh codes and each code is 64 bits long for IS-95A and IS-95B (TIA/EIA-95 "Mobile Station—Base Station Compatibility Standard for Dual-Mode Spread Spectrum Systems"), and there are 64 or 128 Walsh codes with each code being 64 or 128 bits long for IS-2000 (TIA/EIA-2000 "CDMA2000 Standards for Spread Spectrum Systems"). The communication channels of the CDMA system that the Walsh code identifies include a pilot channel (Walsh code 0), a sync channel (Walsh code 32), a number of paging channels (Walsh codes 1 possibly through 7), and a number of traffic channels (any remaining Walsh codes).

Each base station 110a-c may transmit signals using the same frequencies and using the same group of 64 Walsh codes for pilot, paging, sync, and traffic channels. Therefore, another layer of signal encoding may be required so that an MS can differentiate forward and reverse link signaling through individual sectors of the base stations. In CDMA, each sector is distinguished by a specific pseudo-noise offset (i.e., "PN offset") of a PN-sequence that is used to encode communications with mobile stations operating in the cell.

Two versions of PN sequences are typically used and are defined in the CDMA digital cellular system common air interface standard known as Interim Standard 95 ("Mobile Station-Base Station Compatibility Standard for Dual-Mode Wideband Spread Spectrum Cellular System," TIA/EIA Interim Standard (IS-95)). One sequence is a short PN-sequence that is approximately 15 bits long and can be configured in $2^{15}$ (32,768) different PN sequences. The short PN-sequence (and other PN-sequences) may transmit at a chip rate of about 1.2288 Mchips/sec (mega-chips per second), so that the short PN-sequence repeats about every 26.67 ms (milli-seconds). Another sequence is a long PN-sequence and may have $2^{42}$–1 different patterns (i.e., 4,398,046,511,103 patterns), each 42 bits long.

A useful property of the short and long PN-sequences, and possibly other spreading sequences, is that sections within them, offset from one another, appear to be orthogonal. Individual base stations can utilize the same spreading sequence with a different "starting point" or time delay (usually 64 bits long) to encode forward link signals for each respective sector of a cell site in network 100. Therefore, each sector may encode signals using the PN-sequence offset by a respective time, e.g., a PN-offset. This enables MS 102 to distinguish between sectors of base station 110b to enable "handoff" between the sectors, for example, as MS 102 moves into communication with other sectors of base station 110b. At any given instant, a mobile station may thus operate in a given sector, and may thereby communicate with the serving base station using the PN offset of that sector.

Repeating Wireless Signals

In the exemplary embodiment, the number of base stations and the number of sectors that repeater 106 repeats signals to can be minimized to just one base station, or just one sector (one PN offset) of the base station. This enables the repeater to perform a handoff by repeating signals to a selected base station or a selected sector.

Figure 2:
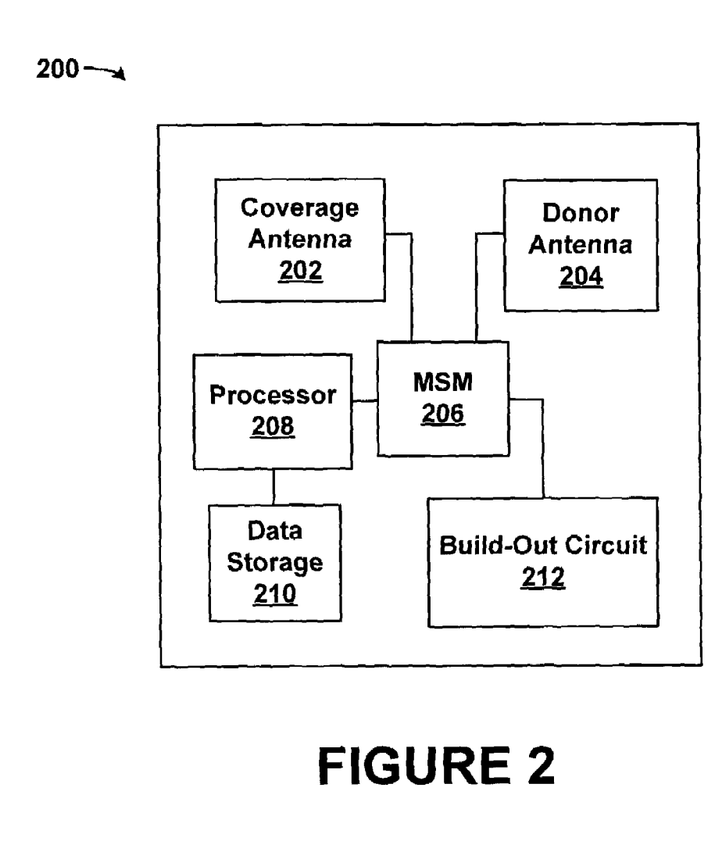
FIG. 2 illustrates an example of a repeater that may operate according to an exemplary embodiment of the present invention.

FIG. 2 illustrates one embodiment of a repeater 200 that may operate according to an exemplary embodiment of the present invention. Repeater 200 includes a coverage antenna 202 that communicates with mobile stations, a donor antenna 204 that communicates with a base station, a mobile station modem (MSM) 206, a processor 208, data storage 210, and a build-out circuit 212 that boosts communications from the base station to mobile stations. Coverage antenna 202 and donor antenna 204 couple to MSM 206, which couples to processor 208 and to build-out circuit 212. In turn, processor 208 couples to data storage 210. Repeater 200 may be able to receive a signal distorted by transmission losses and to regenerate or replicate the signal. Repeater 200 may be an analog repeater that may only be able to amplify the signal or a digital repeater that can reconstruct a signal to near its original quality.

Coverage and donor antennas 202 and 204 may be any type of antenna or antenna array, and can be configured in any desired manner. For example, coverage and/or donor antennas 202 and 204 may be omni-directional antennas or directional antennas. In addition, coverage and/or donor antennas 202 and 204 may include more than one antenna element. For example, coverage and/or donor antennas 202 and 204 may include multiple antennas each positioned to transmit wireless signals in a respective direction. In addition, to provide directional antenna capabilities without using directional antennas, antennas or antenna elements could also be mounted on a stepper motor, which could incrementally change the direction in which the antennas transmit wireless signals.

Furthermore, the phase of radiating components can be varied electronically to produce a moving radiation pattern with no moving parts. For example, coverage and/or donor antennas 202 and 204 may be phased array (PA) antennas. A PA antenna comprises many radiating elements each with a phase shifter. The radiating elements may be spaced such that together they can radiate wireless signals to a desired direction. Each element can produce a signal with a fixed amplitude and phase angle for a certain drive voltage. By assembling a number of antenna elements to form the PA antenna, the direction of a main beam (its directivity) can be controlled through the adjustment of the signal amplitude and phase of each antenna element in the array. Beams are formed by shifting the phase of the signal emitted from each radiating element, to provide constructive/destructive interference so as to steer the beams in a desired direction. The signal can be amplified by constructive interference in the main direction. The beam sharpness or directivity can be improved by the destructive interference. The use of the PA antenna has the effect of summing the signal at points in space where it is desirable with constructive inference and taking advantage of destructive interference to cancel out the signal in space where the signal is not desired.

MSM 206 may include a number of components, such as but not limited to, an RF interface, a processor, a vocoder, a codec, and a rake receiver, for example. MSM 206 will receive wireless signals from coverage and donor antennas 204 and 206. All signals will be encoded with the same Walsh codes and the same PN-sequence. Therefore, MSM 206 distinguishes between the signals by identifying PN-offsets using a rake receiver. The rake receiver can do this because the Walsh codes are orthogonal and the PN-sequence is orthogonal to itself at the different offsets.

MSM 206 acquires (locks onto) the strongest base station pilot signal and repeater 200 repeat signals to that base station. MSM 206 continually tracks the strongest pilot signal in frequency and in PN-offset. Because all base stations use the same PN-sequences in their pilot signals, except with different offsets, MSM 206 will make a single search through all offsets to find the strongest base station pilot signal. MSM 206 uses the acquired pilot signal to establish synchronism with system timing, which then enables MSM 206 to obtain system control information from messages transmitted by the base station on the forward link's synchronization and paging channels (sync channel-Walsh code 32; paging channels-Walsh codes 1 possibly through 7). The synchronization channel repeatedly broadcasts a message containing identification and timing parameters that include base station and cellular system identification numbers and base station PN-offset indices. MSM 206 can measure the strength of other base station pilots and store information about their strengths in a table in the data storage 210.

MSM 206 then measures signal-to-noise ratios ($E_C/I_O$) for each PN-offset. Processor 208 will record in data storage 210 characteristics of received signals, such as the PN offsets and corresponding signal-to-noise ratios, for example. Given this data, processor 208 can then instruct donor antenna 204 to radiate signals in the direction where MSM 206 detected the strongest signal-to-noise ratio.

Processor 208 may include a programmable digital signal processing engine or an application specific integrated circuit (ASIC), which may be able to execute machine language instructions. And data storage 210 may include high-speed random access memory (RAM), or some other high-speed memory device or memory circuitry.

Build-out circuit 212 operates to amplify signals received from MSM 206. The amplified signals can then be transmitted by coverage antenna 202 or donor antenna 204. Build-out circuit 212 may include any number of amplifiers and filters in any type of desired arrangement, for example.

According to the exemplary embodiment, donor antenna 204 of repeater 200 will be a smart antenna such as a PA antenna that can dynamically (e.g., automatically in real time) point a narrow beam in a desired direction (e.g., by changing the phases of its various elements). In operation, processor 208 will monitor loads of base stations within its coverage areas by causing donor antenna 204 to sweep over a coverage area, preferably through increments to collect signals. At each increment, donor antenna 204 will receive wireless signals and pass the signals to MSM 206. MSM 206 will then apply a rake receiver to identify characteristics of the wireless signals, such as the PN-offsets in the received signals and to measure a signal-to-noise ratio ($E_C/I_O$) for each PN-offset, and processor 208 will record in data storage 210 the PN offsets and corresponding signal-to-noise ratios at that increment. Given this data, processor 208 will then instruct donor antenna 204 to move to the increment where MSM 206 detected the strongest signal-to-noise ratio.

As a result, donor antenna 204 will point at a base station that is likely to carry the least amount of load or that has the most surplus capacity (since it has the highest signal-to-noise or carrier-to-cochannel interference (C/I) ratio). Further, if the beam width of the donor antenna is sufficiently narrow, repeater 200 will likely receive signals from just that base station and repeater 200 will receive few if any signals from other base stations.

Figure 3:
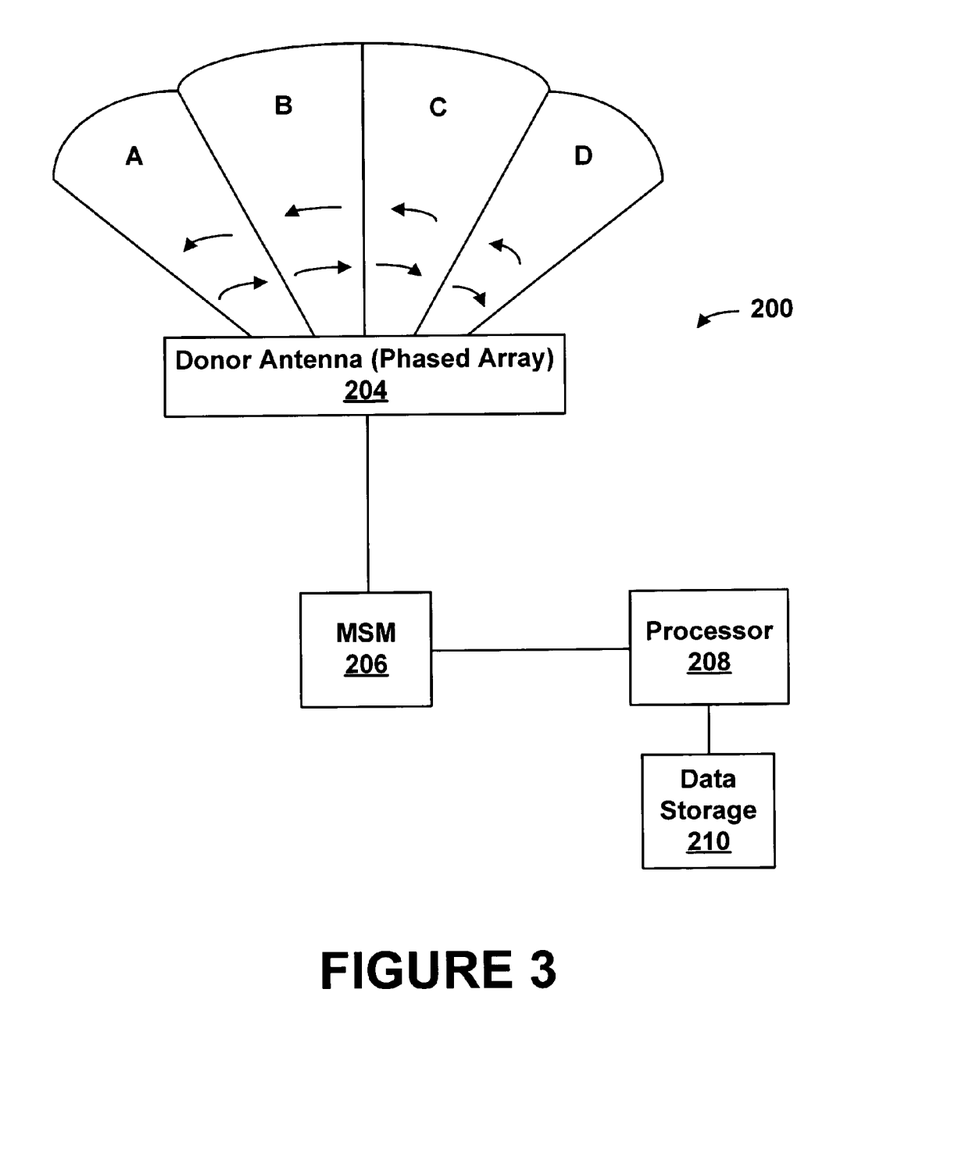
FIG. 3 illustrates one embodiment of a repeater sweeping over a coverage area through increments to gather wireless signals.

FIG. 3 illustrates one embodiment of donor antenna 204 sweeping over a coverage area through increments to gather wireless signals. As shown in this example, donor antenna 204 collects signals in four increments, e.g., A, B, C, D, however more or fewer may be used. Processor 208 may initially direct donor antenna 204 to receive wireless signals from the area denoted by sector A by adjusting the phase angle for each antenna element of the PA antenna. Processor 208 may then direct donor antenna 204 to receive wireless signals from the area denoted by sector B by re-adjusting the phase angle for each antenna element of the PA antenna. Processor 208 can continue to adjust the phase angles of the antenna elements so as to sweep across an entire area to collect wireless signals incrementally. In this manner, processor 208 may scan an area using any number of increments.

As another example, donor antenna 204 may comprise multiple antenna elements, each of which is directed to radiate signals in a desired direction, such as for example, to produce radiation patterns A, B, C, and D. Processor 208 can then simply "turn on" a specific antenna element to receive signals from that area. Processor 208 can then use this process to incrementally collect signals over an entire area. As a further example, donor antenna 204 may comprise a directional antenna that is mounted on a rotational motor. Processor 208 can then direct donor antenna 204 to physically rotate, in an incremental fashion, to collect signals over an area.

Figure 4:
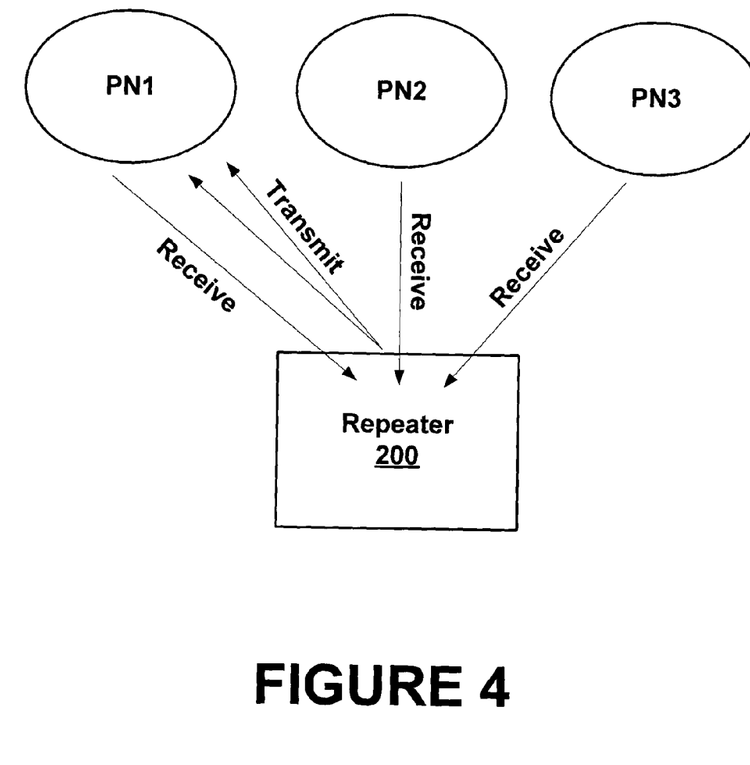
FIG. 4 illustrates one embodiment of dynamically directing a wireless repeater according to the present invention.

In another example, the phase array antenna of the repeater 200 might be able to receive signals from all of the base stations in its coverage area, and then cancel out the signals that have PN-offsets with a lower C/I. In this manner, the repeater 200 may effectively only pass on to the transmit side of the repeater 200 the signals that have PN-offsets with the highest C/I. FIG. 4 illustrates one example of this process. The repeater 200 may receive signals that have PN-offsets PN1, PN2, and PN3 from three different coverage areas. The processing engine of the repeater 200 may then determine the PN-offsets of the received signals and the C/I ratio of these signals. In the illustration in FIG. 4, the repeater 200 determines that signals that have PN1 have the highest C/I, therefore, the phase array antenna only needs to form a beam on the transmit side from the repeater 200 to the donor base station with the coverage area of PN1. Signals that have PN2 and PN3 are not retransmitted, and are therefore cancelled out.

As donor antenna 204 collects wireless signals, processor 208 may note the phase of the PA antenna at which signals were collected, or the antenna element that collected signals, or an angle at which the directional antenna was pointing when signals were collected (depending on the type of antenna employed as donor antenna 204), for each increment using an increment identifier or a coverage area identifier, for example. Processor 208 can store this information in data storage 210 for later use. As described below, processor 208 may direct donor antenna 204 to radiate signals in a direction or to an area defined by one of the increments.

The processor 208 can instruct donor antenna 204 to radiate in a desired direction based on a high signal-to-noise ratio (possibly the strongest) of a given base station. Processor 208 may instruct donor antenna 204 to radiate in a desired direction by adjusting the signal amplitude and phase of each antenna element in the PA antenna, for example, based on the stored information in data storage 210. Processor 208 can query data storage 210 to determine from what increment, or from what sector donor antenna 204 collected signals that had the strong signal-to-noise ratio. Processor 208 can also determine the desired sector by querying data storage 210 to determine the PN-offset associated with the strong signal-to-noise ratio. Processor 208 can then direct donor antenna 208 to radiate and receive signals at that sector or that increment, or to and from that area.

In this manner, processor 208 dynamically points repeater 200 at the base station that provides repeater 200 with a high pilot signal (possibly the strongest) at any given moment. Therefore, repeater 200 may simply operate for one base station at a time. Of course, the particular base station which repeater 200 operates for may change over time, based on the number of mobile stations in communication with the various base stations, for example. As a result, repeater 200 may perform a handoff of calls from one base station to another or from one sector to another if repeater 200 detects a higher signal-to-noise ratio, e.g., if repeater 200 detects a base station or sector with a smaller load or surplus capacity. Existing repeaters simply operate to extend the coverage areas of base stations. However, in the exemplary embodiment, repeater 200 will operate to extend the coverage area of the base station that carries a low amount of traffic (possibly the least amount of traffic) at any given point in time so as to attempt to load balance the base stations and sectors and to provide the mobile stations with the strongest possible signals.

Preferably, repeater 200 will determine which base station has the least traffic, periodically to account for changing conditions. For example, repeater 200 may collect signals at predetermined time intervals, such as once an hour, from all transmitting base stations within repeater's 200 coverage area. On the other hand, repeater 200 may continuously collect signals, continuously determine what base station within its coverage area has the least load or most surplus capacity as characterized by having a high signal-to-noise ratio, and further continuously determine what sector of this base station has the least load. In this manner, repeater 200 monitors the loads of the base stations within its coverage areas to dynamically determine when to perform a handoff so that repeater 200 transmits signals to base stations that have surplus capacity. Repeater 200 may monitor the loads of the base stations in other manners as well, such as by determining a number of dropped calls, for example. Other examples are possible as well.

Figure 5:
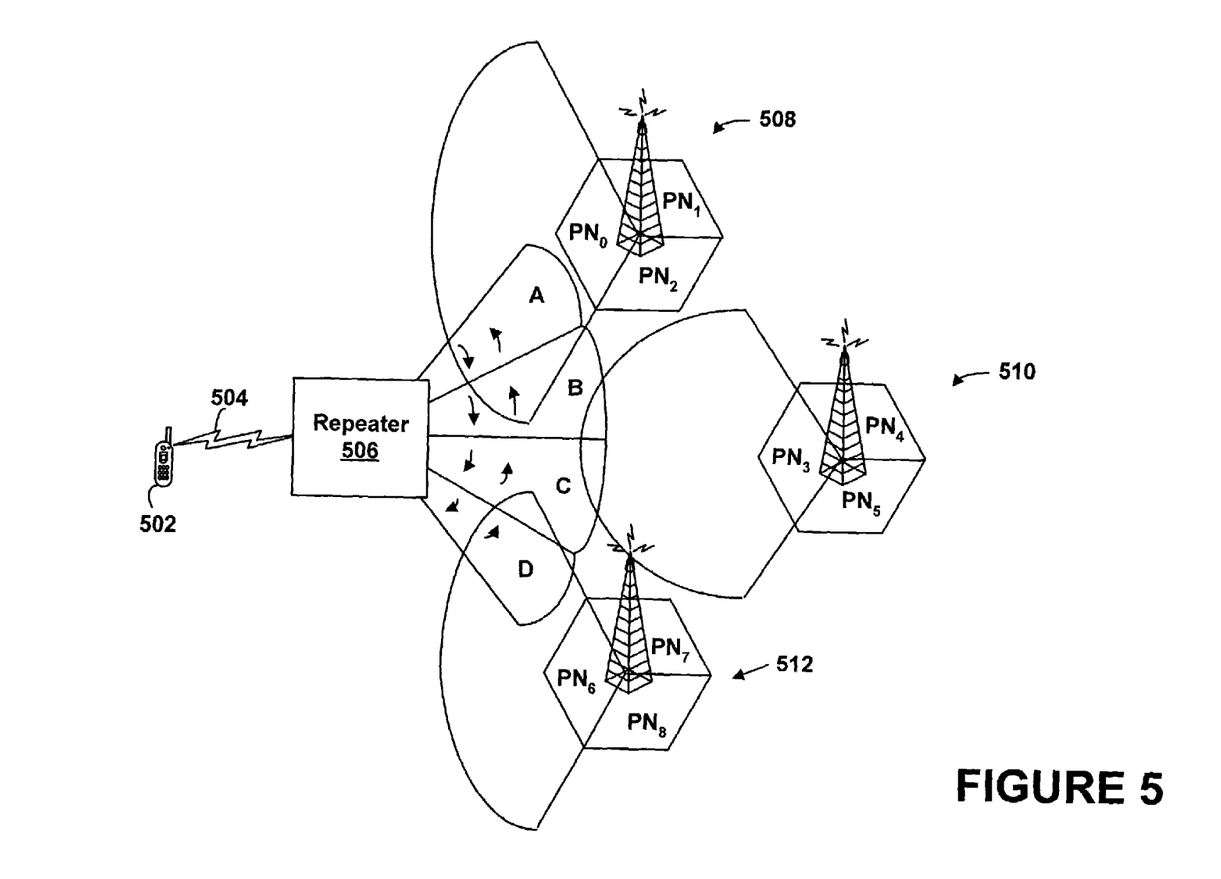
FIG. 5 illustrates another embodiment of dynamically directing a wireless repeater according to the present invention.

FIG. 5 illustrates one embodiment of dynamically directing a wireless repeater. An MS 502 may communicate via wireless link 504 with repeater 506. In turn, repeater 506 may boost the signals, and transmit the signals to whichever base station MS 502 is in communication. MS 502 may then communicate with the base stations on the reverse link and the base stations may communicate with MS 502 on the forward link.

On the reverse link, repeater 506 will transmit signals to either base station 508, 510, or 512. Repeater 506 will incrementally sweep across coverage areas A, B, C, and D to collect signals from all base stations within repeater's 506 coverage area. While collecting signals, repeater 506 notes from what coverage area the signals were collected. For example, all three base stations 508, 510, and 512 are divided into three sectors, each of which operates according to a respective PN-offset (e.g., PN0-PN8), and repeater 506 notes from which sector signals were collected. (Alternatively, the repeater 506 may simply determine the PN-offsets of received signals as described in FIG. 4). Repeater 506 then determines a C/I ratio for each received signal (by identifying the pilot channels (i.e., Walsh code 0) of the signals and comparing their signal strength to the remaining total noise) and determines a high or the highest (C/I) ratio among the collected signals. Repeater 506 will repeat signals to the coverage area in which it received signals having a high C/I ratio. Repeater 506 will therefore repeat signals to the base station with a low load (characterized by having a strong pilot signal compared to the amount of interference).

To maintain the integrity of a call when repeater 506 determines that its current serving base station is overloaded (e.g., that the measured C/I ratio of signals is too low due to too much interference), repeater 506 can handoff calls from the current base station to another base station with a stronger C/I ratio. Repeater 506 may periodically determine C/I ratios for each coverage area A-D to determine the load of the base stations within these coverage areas. For example, suppose repeater 506 is currently communicating with base station 508, but repeater 506 determines that base station 512 has a lower load. Beam A of repeater 506 will fade out and beam D will fade in over a time period and MS 502 can then recognize the pilot signal from base station 512 within this time period to perform the handoff. During the handoff, MS 502 may be in communication with both base stations 508 and 512 for a short time. Therefore, repeater 506 performs a handoff by changing the direction that it repeats signals in order to change base stations (or sectors of base stations) to which it repeats signals.

Figure 6:
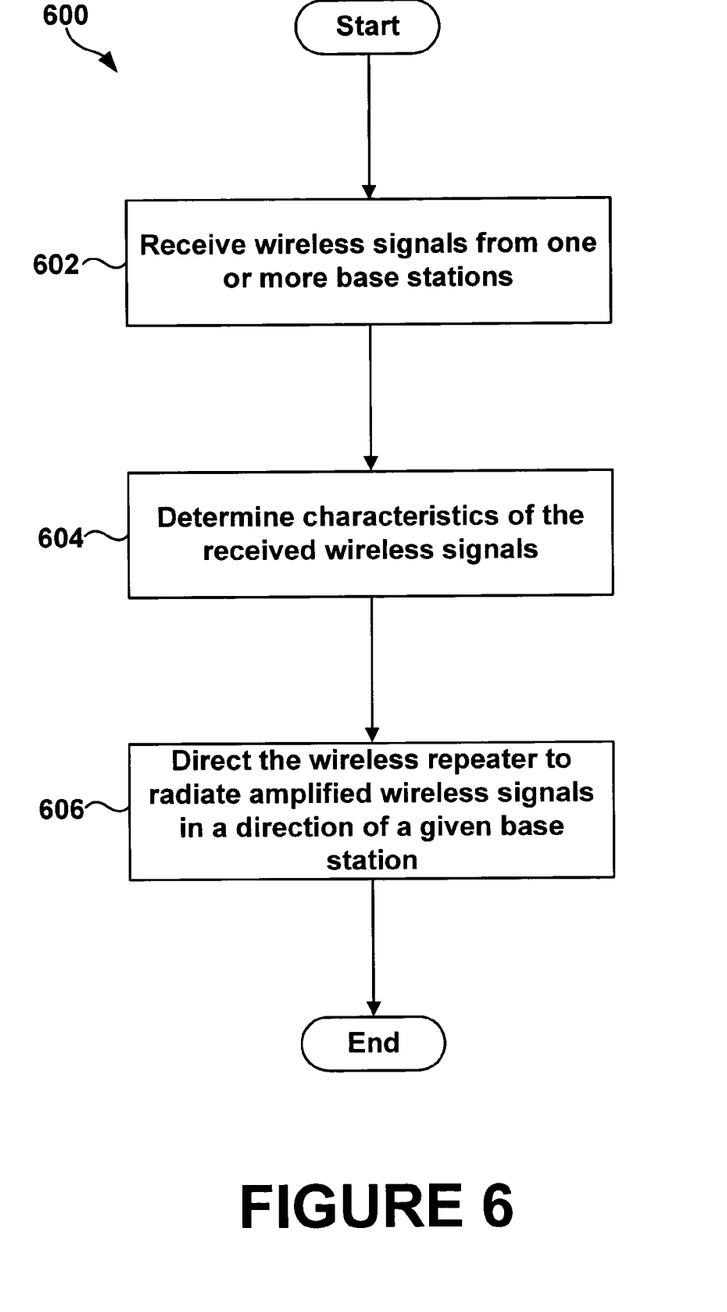
FIG. 6 is a flowchart depicting functional blocks of one embodiment of a method of dynamically directing a wireless repeater.

FIG. 6 is a flowchart depicting functional blocks of one embodiment of a method 600 of dynamically directing a wireless repeater, as illustrated in FIG. 5. Initially, the wireless repeater will receive wireless signals from one or more base stations, as shown at block 602. The wireless repeater may be incrementally adjusted to receive the wireless signals from a number of coverage areas. Next, the wireless repeater determines characteristics of the received wireless signals, as shown at block 604. The repeater may determine PN-offsets and signal-to-noise ratios of the received wireless signals, and also the repeater can then determine which base stations within its coverage areas has the most surplus capacity. The wireless repeater may then be directed to radiate amplified wireless signals in a direction of a given base station, as shown at block 606. In doing so, the wireless repeater will be directed to radiate the amplified wireless signals to one of a number of coverage areas from which the repeater received wireless signals, such as to a base station that has the least amount of traffic (or the most available capacity) at this point in time.

Pilot Interference Reduction

Within the exemplary embodiment, the repeater is directed to repeat signals to a specified base station and/or to a specified sector of a base station. However, the repeater will still repeat signals on multiple PN offsets, such as signals received from other mobile stations, even though the repeater is directed to radiate signals only to one base station or one sector. As a further improvement, the exemplary repeater may employ "pilot interference reduction" technology of the type available from companies such as TensorComm Inc. and Nokia. Once a sector to which the repeater will repeat signals is selected, the repeater can further perform pilot interference to only repeat signals that have the PN-offset of the selected sector.

Pilot interference reduction technology involves applying destructive interference to remove signals on certain PN offsets. This way, the repeater can be made to repeat signals on just the strongest PN-offset, with substantially no interference from signals on other PN-offsets.

The repeater, such as repeater 506, includes a rake receiver that attempts to gather as much signal power as possible by identifying multi-path replicas of transmitted signals and assigning separate correlators to each of them. These correlators are commonly referred to as the rake "fingers" and a rake receiver typically has three of four fingers. Each finger may be configured to independently recover a particular code.

Figure 7:
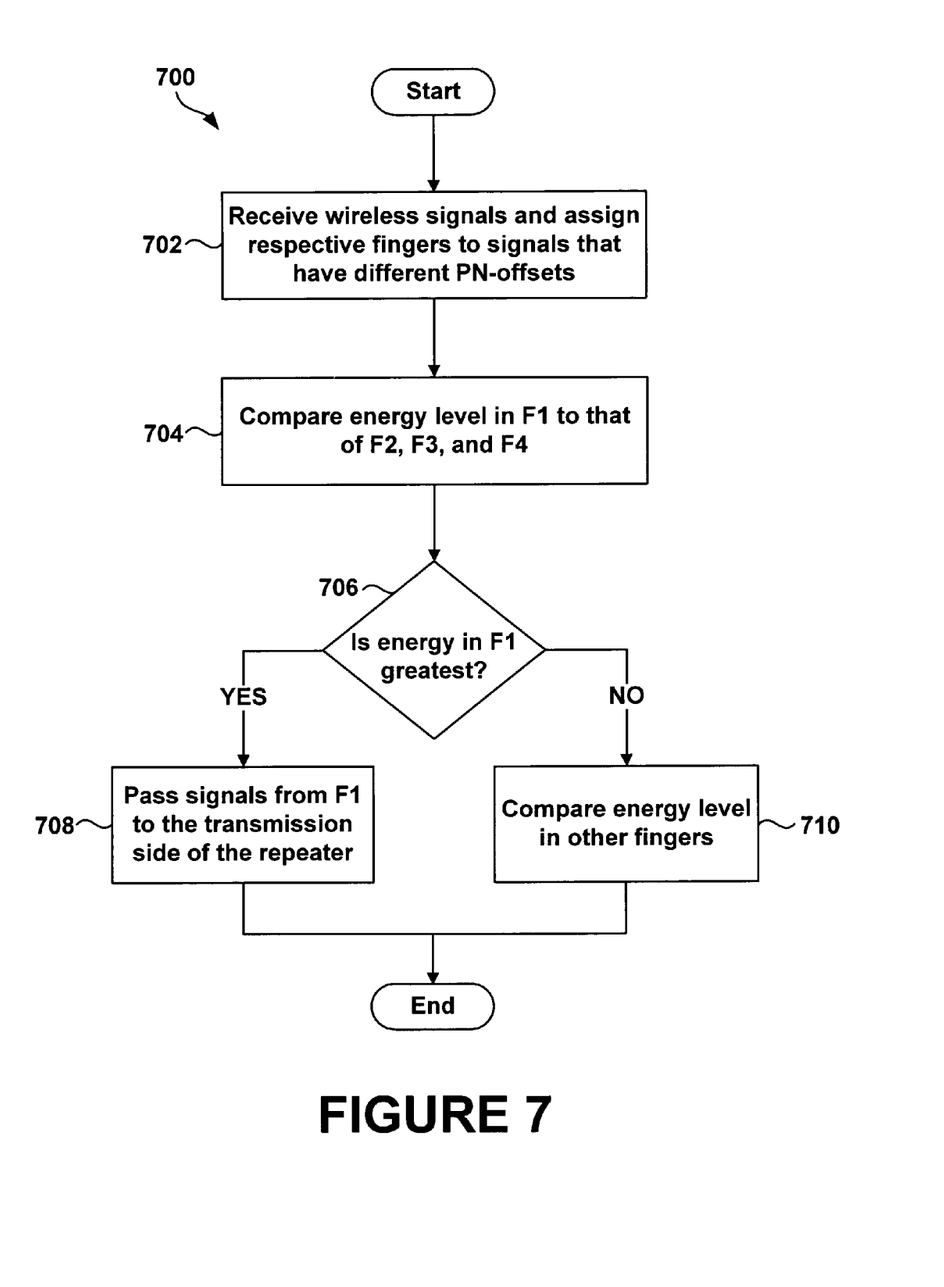
FIG. 7 is a flowchart depicting functional blocks of one embodiment of a method of pilot interference reduction.

FIG. 7 is a flowchart depicting functional blocks of one embodiment of a method 700 of pilot interference reduction. The repeater will receive signals and assign a respective finger to signals that have different PN-offsets, as shown at block 702. For example, suppose the repeater received four signals. Each signal is assigned to a different finger of the rake receiver, e.g., F1, F2, F3 and F4. The rake receiver can then compare energy levels in F1 to that of F2, F3 and F4, as shown at block 704. If the energy level in F1 is greater than that in F2, F3 or F4, then signals at F1 have the greatest energy, as shown at block 706. The signals at F1 are then passed through the repeater to the transmit side of the repeater, as shown at block 708. In this manner, the repeater will only repeat signals that have the PN-offset of those at F1. The repeater may only repeat signals on just the strongest PN-offset.

If the energy level at F1 is less than the energy level at any of F2, F3 or F4, then the repeater will compare the energy level at F2 to determine if the signals at F2 have the greatest energy levels. The repeater continues this process until the finger that has the highest energy value is determined, as shown at block 710. In this way, only the signals with the PN-offsets with the best C/I are provided to the transmission side of the repeater. Therefore, the repeater may only repeat signals to one sector.

This method 700 can be extrapolated to enable the repeater to provide a better replica of a signal that was transmitted from the base station. For instance, an input and output signature of the signal (i.e., copies of the signal) to each finger of the rake receiver can be created. The output signatures can then be compared to the original input signal signature. Based on the comparison, noise within the signals can be subtracted out, and a clean signal may be retransmitted by the repeater. For more information on this process, the reader is referred to technology of the type available from TensorComm Inc.

While exemplary embodiments have been described, persons of skill in the art will appreciate that variations may be made without departure from the scope and spirit of the invention. This true scope and spirit is defined by the appended claims, which may be interpreted in light of the foregoing.

What is claimed is:

1. A method for dynamically directing a wireless repeater, the wireless repeater having a processor, data storage, a mobile station modem, and an antenna, the method comprising:
   (a) the processor causing the antenna to sweep over a coverage area through increments and to thereby wirelessly receive forward link signals from a plurality of base stations;
   (b) at each increment, the mobile station modem determining a signal-to-noise ratio of the received forward link signals;
   (c) the processor storing in the data storage the determined signal-to-noise ratios per increment;
   (d) the processor determining which increment has a strongest determined signal-to-noise ratio and responsively causing the antenna to radiate reverse link signals at the determined increment; and
   (e) repeating steps (a)-(d) at least once, to dynamically redirect the antenna to radiate at a different increment.

2. The method of claim 1, wherein the antenna comprises directional antenna components, and wherein the processor causes the antenna to sweep over the coverage area through the increments by causing the directional antenna components to move through the increments.

3. The method of claim 1, further comprising the processor storing in the data storage for each increment an indication of a PN-offset of forward link signals received at the increment.

4. The method of claim 3, further comprising the mobile station modem determining the PN-offset at each increment.

5. The method of claim 1, wherein causing the antenna to radiate signals at the determined increment results in the antenna radiating in a direction of a given sector of a given base station.

6. A wireless repeater comprising:
   a donor antenna;
   a processor;
   data storage;
   a mobile station modem;
   wherein the processor is programmed to cause the donor antenna to sweep across a coverage area through increments so as to wirelessly receive forward link signals from a plurality of base stations;
   wherein the mobile station modem receives the forward link signals from the donor antenna and identifies characteristics of the received forward link signals;
   wherein the processor is programmed to store in the data storage the identified characteristics per increment and to use the identified characteristics to select a given increment;
   wherein the processor is programmed to then cause the donor antenna to radiate amplified reverse link signals at the selected increment.

7. The wireless repeater of claim 6, wherein characteristics comprise signal-to-noise ratio, and wherein the processor uses the identified characteristics to select the given increment by selecting as the given increment the increment that has a highest signal-to-noise ratio of all of the increments.

8. The wireless repeater of claim 6, wherein the processor is further programmed to again cause the donor antenna to sweep across the coverage area through the increments, to store new characteristics per increment, to use the new stored characteristics to select a different increment, and to cause the donor antenna to radiate amplified reverse link signals at the different increment.

9. The wireless repeater of claim 6, wherein the characteristics are selected from the group consisting of PN-offsets of the forward link signals and a signal-to-noise ratio ($E_C/I_O$) of the forward link signals.

10. The wireless repeater of claim 9, wherein the characteristics comprise PN-offsets and signal-to-noise ratios per PN-offset.

11. The wireless repeater of claim 6, wherein the mobile station modem includes a rake receiver that identifies PN-offsets of the forward link signals.

12. The wireless repeater of claim 6, wherein the processor records in the data storage both PN-offsets and signal-to-noise ratios of the forward link signals at each increment.

13. The wireless repeater of claim 6, wherein the donor antenna comprises a phased array antenna, and wherein the processor controls direction of the donor antenna through control of phase and amplitude of antenna components.

14. The wireless repeater of claim 6, wherein the donor antenna is mounted on a stepper motor to direct the donor antenna at the increments.

* * * * *